(12) United States Patent  
Kim et al.

(10) Patent No.: US 9,196,953 B1  
(45) Date of Patent: Nov. 24, 2015

(54) ANTENNA WITH ADJUSTABLE ELECTRICAL PATH LENGTH

(71) Applicant: Amazon Technologies, Inc., Seattle, WA (US)

(72) Inventors: Namhoon Kim, San Jose, CA (US); Adrian Napoles, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/552,339

(22) Filed: Nov. 24, 2014

(51) Int. Cl.
*H01Q 1/24* (2006.01)
*H01Q 1/50* (2006.01)
*H04B 1/401* (2015.01)

(52) U.S. Cl.
CPC ............. *H01Q 1/243* (2013.01); *H01Q 1/50* (2013.01); *H04B 1/401* (2013.01); *H01Q 1/246* (2013.01)

(58) Field of Classification Search
None
See application file for complete search history.

(56) References Cited

U.S. PATENT DOCUMENTS

| | | | |
|---|---|---|---|
| 7,088,306 B2 * | 8/2006 | Chiang et al. | 343/817 |
| 2005/0237198 A1 * | 10/2005 | Waldner et al. | 340/572.7 |
| 2009/0046019 A1 * | 2/2009 | Sato | 343/702 |
| 2012/0056677 A1 * | 3/2012 | Zhu et al. | 330/296 |
| 2013/0009845 A1 * | 1/2013 | Huang et al. | 343/860 |
| 2013/0027257 A1 * | 1/2013 | Tanaka et al. | 343/713 |
| 2014/0145900 A1 * | 5/2014 | Wong et al. | 343/860 |

* cited by examiner

*Primary Examiner* — Leon-Viet Nguyen
(74) *Attorney, Agent, or Firm* — Lowenstein Sandler LLP

(57) ABSTRACT

Antenna structures and methods of operating an antenna of an electronic device are described. A system may include an antenna comprising a plurality of physically connected elements. The elements may include a respective electrical switch and may have a respective first electrical path length when the electrical switch is in a non-conductive state and a respective second electrical path length when the electrical switch is in a conductive state. The system may further include an antenna controller to receive information indicative of an operating frequency and to configure the antenna to have a total electrical path length corresponding to the operating frequency by operating the switches.

19 Claims, 11 Drawing Sheets

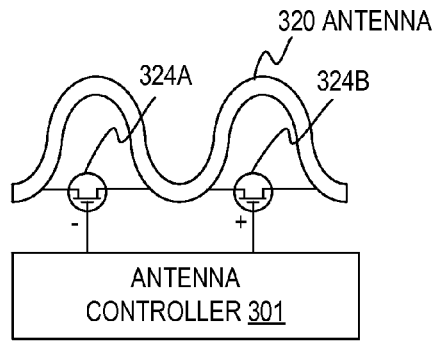
FIG. 3B
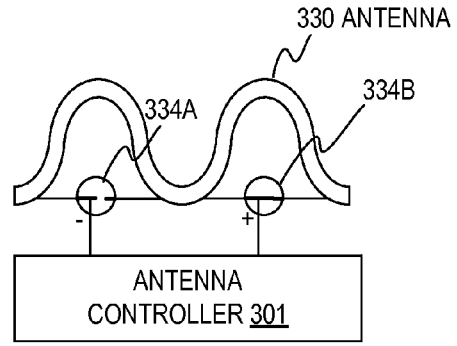
FIG. 3C
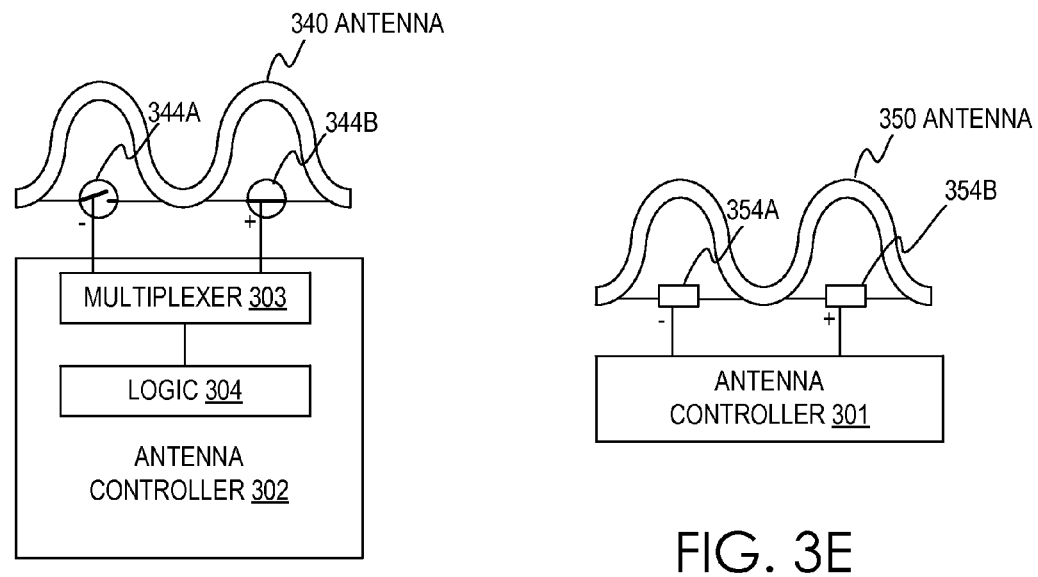
FIG. 3D
FIG. 3E

ANTENNA WITH ADJUSTABLE ELECTRICAL PATH LENGTH

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

The conventional antenna usually has only one resonant mode in the lower frequency band and one resonant mode in the high-band. One resonant mode in the lower frequency band and one resonant mode in the high-band may be sufficient to cover the required frequency band in some scenarios, such as in 3G applications. 3G, or 3rd generation mobile telecommunication, is a generation of standards for mobile phones and mobile telecommunication services fulfilling the International Mobile Telecommunications-2000 (IMT-2000) specifications by the International Telecommunication Union. Application services include wide-area wireless voice telephone, mobile Internet access, video calls and mobile TV, all in a mobile environment. The required frequency bands for 3G applications may be GSM850/EGSM in low-band and DCS/PCS/WCDMA in high-band. The 3G band is between 824 MHz and 960 MHz. Long Term Evolution (LTE) and LTE Advanced (sometimes generally referred to as 4G) bands are communication standards that have been standardized by the 3rd Generation Partnership Project (3GPP). However, in order to extend the frequency coverage down to 700 MHz for 4G/LTE application, antenna bandwidth needs to be increased especially in the low-band. There are two common LTE bands used in the United States from 704 MHz-746 MHz (Band 17) and from 746 MHz-787 MHz (Band 13). Conventional solutions increase the antenna size or use active tuning elements to extend the bandwidth. Alternatively, conventional solutions use separate antennas to achieve different frequency bands and use a switch to switch between the antennas.

BRIEF DESCRIPTION OF THE DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 3B illustrates an antenna including two MOSFETs (metal-oxide-semiconductor field-effect transistors) according to one embodiment.

FIG. 3C illustrates an antenna including two piezoelectric elements according to one embodiment.

FIG. 3D illustrates an antenna including two lever elements according to one embodiment.

FIG. 3E illustrates an antenna including two variable reactance elements according to one embodiment.

DETAILED DESCRIPTION

Antenna structures and methods of operating the same of an antenna with an adjustable electrical path length are described. An antenna may be designed to be resonant at an intended frequency of operation. For example, a dipole antenna may have an electrical antenna path length approximately equal to a multiple of a half-wavelength of the intended frequency of operation. As another example, a monopole antenna may have an electrical path length approximately equal to a multiple of a quarter-wavelength of the intended frequency of operation. In many cases, the antenna electrical path length is approximately equal to the physical antenna path length.

For an electronic device to communicate using two different frequencies, the electronic device may include two antennas with different electrical path lengths. For example, to communicate using a WiFi protocol at 2.4 GHz, the electronic device may include a first antenna having an electrical path length approximately equal 3.12 cm. To communicate using a 4G LTE protocol at 700 MHz, the electronic device may include a second antenna having an electrical path length approximately equal to 10.7 cm.

A single antenna structure with a variable electrical path length may be used to communicate at different frequencies. A variable-length antenna may replace two or more antennas in an electronic device, thereby saving costs. Further, a variable-length antenna may provide fine tuning of the electrical path length, resulting in greater signal strength at a wide variety of frequencies.

One embodiment of an antenna with an adjustable electrical path length includes a number of elements electrically coupled in series, each of the elements including a conductive trace and a switch. The conductive trace and switch may be connected in parallel, with the switch coupling a first end of the conductive trace to a second end of the conductive trace, or in series, with the switch coupling two conductive traces. The antenna may be coupled to an antenna controller which receives information indicative of a frequency and opens or closes the switches to configure the antenna to have an electrical path length corresponding to the frequency.

The antenna (and the antenna controller) may be included in an electronic device. The electronic device (also referred to herein as user device) may be any content rendering device that includes a wireless modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, DVD players, media centers, and the like. The user device may connect to a network to obtain content from a server computing system (e.g., an item providing system) or to perform other activities. The user device may connect to one or more different types of cellular networks.

Figure 1:
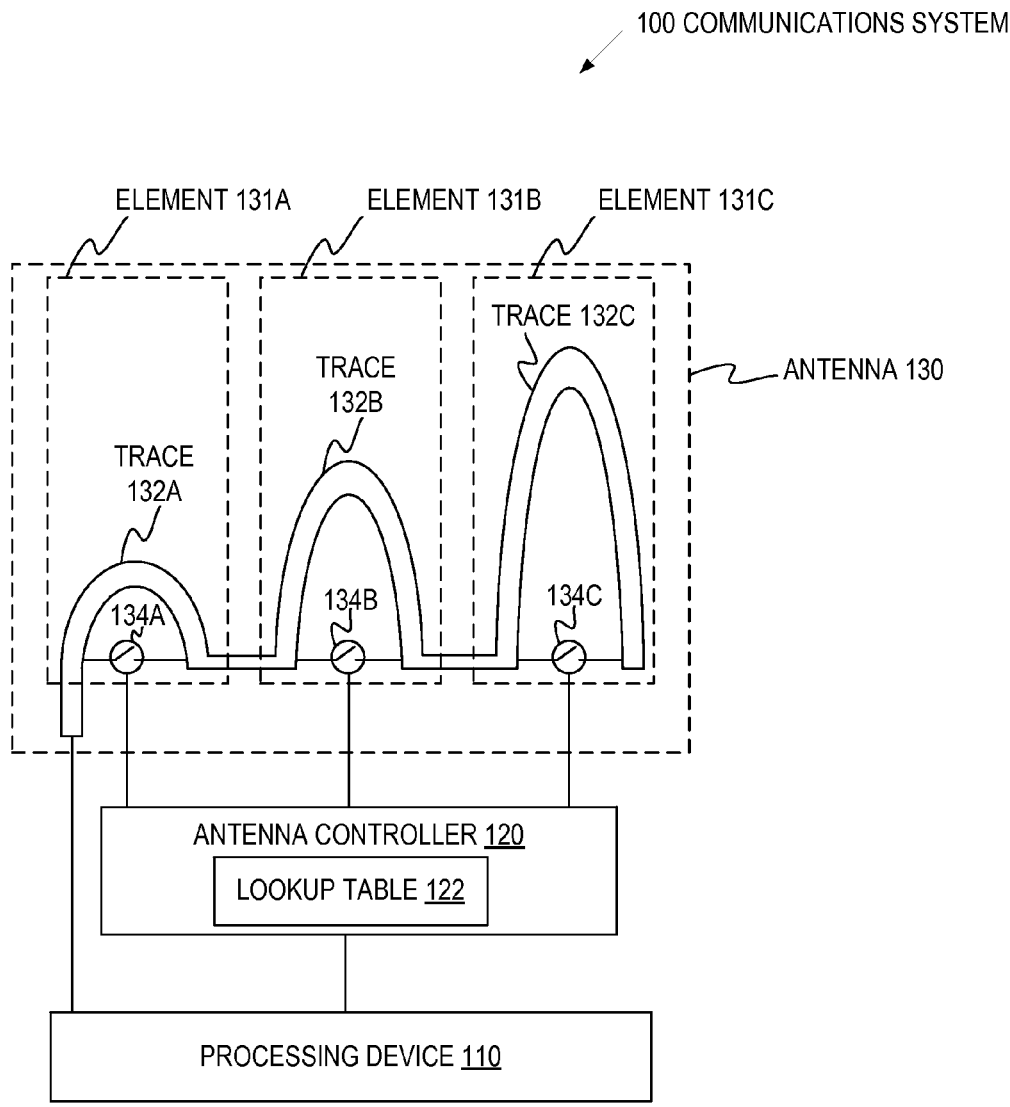
FIG. 1 is a functional block diagram of a communications system according to one embodiment.

FIG. 1 is a functional block diagram of a communications system 100 according to one embodiment. The communications system 100 may be part of an electronic device such as an electronic book reader, a cellular telephone, a tablet computer, a netbook and the like. The communications system 100 includes an antenna 130 with three series-connected controllable elements 131A-131C. Although three elements are illustrated in FIG. 1, it is to be appreciated that the antenna 130 may include more or fewer elements.

Each of the elements 131A-131C includes a respective conductive trace 132A-132C and a respective electrical switch 134A-134C connected in parallel. Although the conductive traces 132A-132C are illustrated in FIG. 1 as having a particular shape, the conductive traces 132A-132C may be any shape. Each conductive trace 132A-132C is a conductive segment having a first end opposite a second end. The first end and second end are connected via an electrical switch 134A-134C. The electrical switches 134A-134C may be any type of electromechanical or solid state switch. For example, the electrical switches 134A-134C may include one or more of MEMS (microelectromechanical systems) switches, pin diodes, or MOSFETs (metal-oxide-semiconductor field-effect transistors) or other types of transistors.

Each element 131A-131C has a respective first electrical path length when the switch is in an open or non-conductive state and a respective second electrical path length when the switch is in a closed or conductive state. In one embodiment, at least two of the first electrical path lengths for two different elements are different. For example, in FIG. 1, the first element 131A has a shorter electrical path length in the open state than the electrical path length of the second element 131B in the open state. The antenna 130 has a total electrical path length that varies depending on the state of each of the electrical switches 134A-134C. Thus, the resonant frequency of the antenna 130 varies depending on the state of each of the electrical switches 134A-134C. The total electrical path length of the antenna 130 may be the sum of the electrical path lengths of the elements 131A-131C (in whichever state they are in) plus a fixed electrical path length. The fixed electrical path length may derive from, for example, the connection between a processing device 110 and the antenna 130 or the connections between the elements 131A-131C.

The antenna 130 is coupled to a processing device 110. The processing device 110 may transmit and receive electromagnetic signals via the antenna 130 at a resonant frequency of the antenna. The resonant frequency of the antenna may be changed by changing the electrical path length of the antenna 130. The electrical path length of the antenna 130 may be changed by an antenna controller 120 coupled to each of the electrical switches 134A-134C of the antenna 130. Although the antenna controller 120 is illustrated in FIG. 1 as a separate component from the processing device 110, it is to be appreciated that the antenna controller 120 may be a part of the processing device 110.

The antenna controller 120 may receive a signal from the processing device 110 indicative of an intended frequency of operation and may configure the antenna 130 to have a total electrical path length corresponding to the frequency of operation by selectively opening or closing the electrical switches 134A-134C of each of the plurality of elements 131A-131C. Thus, the antenna controller 120 may receive information indicative of a frequency and place one or more of the electrical switches 134A-134C in the open state or the closed state based on the frequency. The antenna controller 120 may include (or be coupled to a separate) lookup table 122 that stores data indicative of a number of different frequencies in respective association with data indicative of which electrical switches 134A-134C are to be opened or closed in order to configure the antenna 130 to have a total electrical path length corresponding to the frequency. In one embodiment, the antenna controller 120 determines which switches to open and close using rules or formula without the use of the lookup table 122.

The antenna controller 120 may apply a first voltage to open a switch and a second voltage to close the switch. For example, the antenna controller may apply a voltage of approximately zero volts to open the switch and apply a voltage of approximately one volt to close the switch. In one embodiment, such as when the electrical switches 134A-134C are solid state switches, the antenna controller 120 may continuously apply the first voltage or the second voltage to maintain the switches in the open or closed state. In another embodiment, such as when the electrical switches 134A-134C are electromechanical switches with hysteresis, the antenna controller 120 may apply a pulse of the first voltage or the second voltage to change the state of a switch, if the antenna controller 120 determines that the state is to be changed.

As noted above, the total electrical path length of the antenna 130 may be the sum of the electrical path lengths of the elements 131A-131C (in whichever state they are in) plus a fixed electrical path length. The minimum electrical path length of the each of the elements 131A-131C, e.g., the electrical path length in the closed state, may be considered part of the fixed electrical path length of the antenna 130 and the difference in electrical path lengths between the open state and the closed state may be considered configurable. Thus, the total electrical path length of the antenna 130 may be expressed as $L_T = L_C + a_1 L_1 + a_2 L_2 + \ldots + a_n L_n$, where $L_T$ is the total electrical path length, $L_C$ is the fixed minimum electrical path length, $L_1, L_2, \ldots, L_n$ are the differences in path length in the open state and the closed state for each element, and each of $a_1, a_2, \ldots, a_n$ is zero when the element is in the closed state and one when the element is in the open state.

The differences in electrical path lengths in the open state and the closed state for each element ($L_1, L_2, \ldots, L_n$) may be selected in a number of ways. In one embodiment, each of the differences is a power of two multiplied by a base length. This can be expressed as $L_i = L_0 2^i$. Thus, the total electrical path length ($L_T$) of the antenna 130 may be the fixed minimum electrical path length ($L_C$) plus a multiple of the base length ($L_0$), where the multiple may be any integer between zero and $2n-1$. In another embodiment, the differences are selected such that the total electrical path length of the antenna 130 can be configured into any one of a fixed set of electrical path lengths.

Figure 2A:
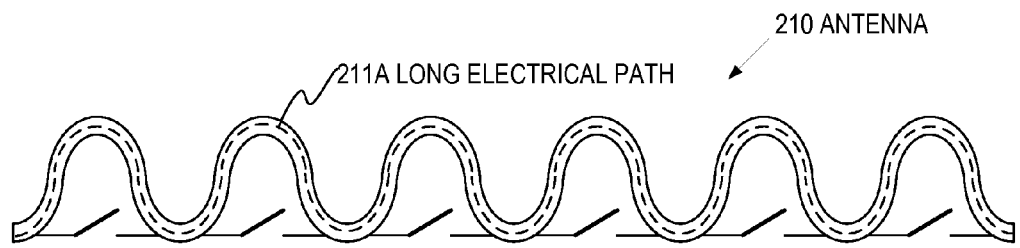
FIG. 2A illustrates an antenna with a long electrical path for receiving or transmitting a low frequency signal according to one embodiment.
Figure 2B:
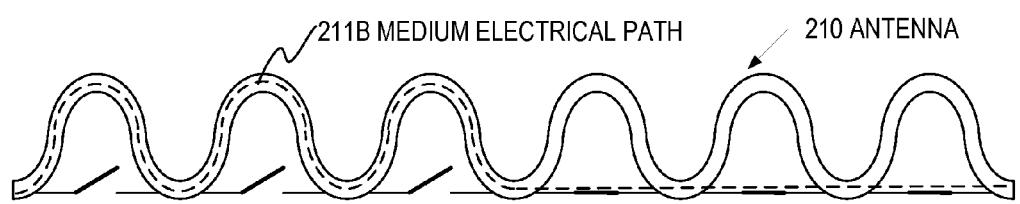
FIG. 2B illustrates the antenna of FIG. 2A with a medium electrical path for receiving or transmitting a medium frequency signal.
Figure 2C:
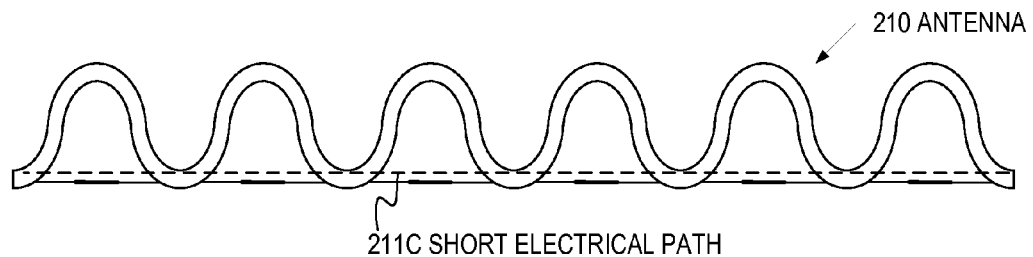
FIG. 2C illustrates the antenna of FIG. 2A with a short electrical path for receiving or transmitting a high frequency signal.

FIGS. 2A-2C illustrate an antenna 210 in three states with three different electrical path lengths 211A-211C. FIG. 2A illustrates the antenna 210 with a long electrical path 211A for receiving or transmitting a low frequency signal according to one embodiment. The antenna 210 includes six elements, each element including a conductive trace and a switch. In FIG. 2A, all of the switches are in an open state such that current does not flow any of the switches and flows through all of the conductive traces. FIG. 2B illustrates the antenna 210 with a medium electrical path 211B for receiving or transmitting a medium frequency signal. In FIG. 2B, half of the switches are in open state and half of the switches are in a closed state. Thus, current flows through half of the conductive traces and through half of the switches. FIG. 2C illustrates the antenna 210 with a short electrical path 211C for receiving or transmitting a high frequency signal. In FIG. 2C, all of the switches are in a closed state. Thus, current flows through all of the switches.

FIGS. 3A-3D illustrate a number of antennas including different types of switches. Although each figure illustrates an antenna with two switches, it is to be appreciated that an antenna may have more than two switches. Further, an antenna may include two or more different types of switches.

Figure 3A:
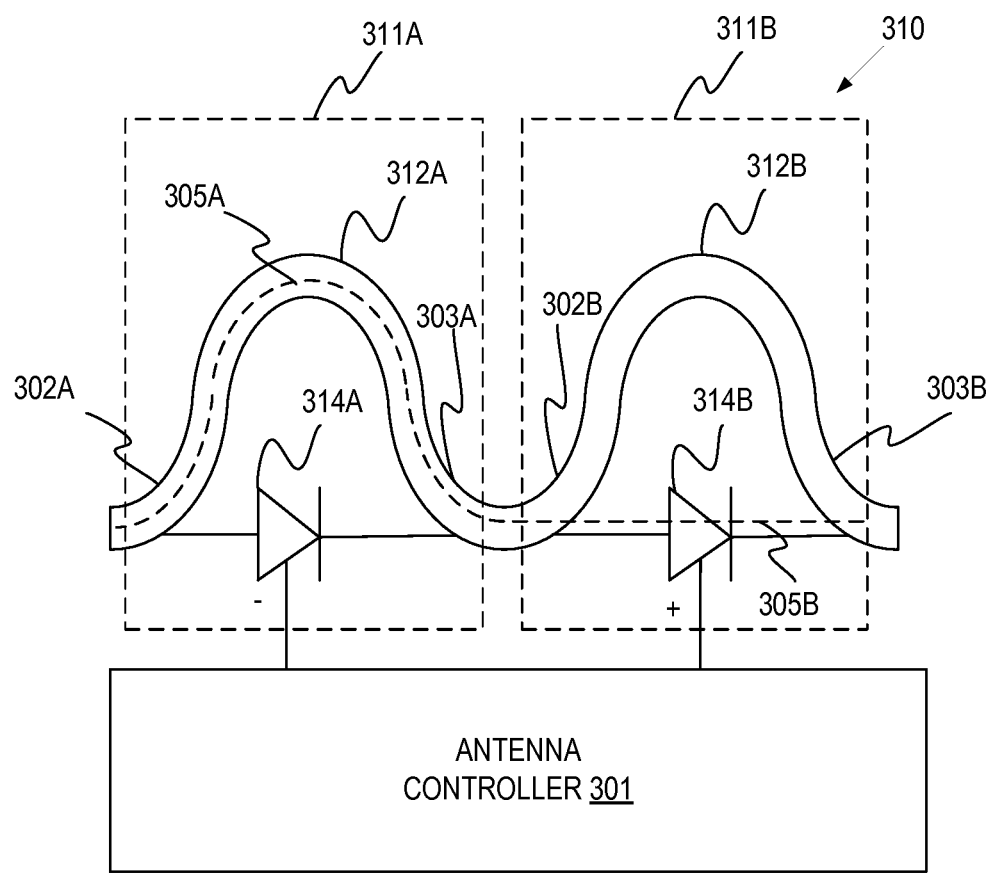
FIG. 3A illustrates an antenna including two pin diodes according to one embodiment.

FIG. 3A illustrates an antenna 310 including two pin diodes 314A-314B according to one embodiment. Each of the pin diodes 314A-314B acts as a switch that can be placed in a non-conductive state in which current does not flow through the pin diode or a conductive state in which current flows through the pin diode. An antenna controller 301 may concurrently apply a first voltage to place the first pin diode 314A in a non-conductive state and a second voltage to place the second pin diode 314B in a conductive state. In one embodiment, the first voltage is approximately zero volts and the second voltage is approximately one volt.

Thus, antenna 310 is a variable-length antenna 310 including a plurality of physically connected elements, including a first element 311A and a second element 311B. The first element 311A includes a first conductive trace 305A with a first end 302A and a second end 303A and a first pin diode 314A coupled between the first end 302A and the second end 303A of the conductive trace 305A. The second element 311B includes a second conductive trace 305B with a first end 302B and a second end 303B and a second pin diode 314B coupled between the first end 302B and the second end 303B of the second conductive trace 305B.

As noted above, the antenna controller 301 is coupled to the first pin diode 314A and the second pin diode 314B. The antenna controller 301 may apply a first voltage or a second voltage to at least one of the first pin diode 314A or the second pin diode 314B. The first element 311A has a first conductive path 305A through the first conductive trace 312A when the first voltage is applied to the first pin diode 314A and a second conductive path (not shown) through the first pin diode 314A when the second voltage is applied to the first pin diode 314A. The first conductive path 305A has a first electrical path length, the second conductive path has a second electrical path length, and the second electrical path length is shorter than the first electrical path length. The second element 311B has a third conductive path (not shown) through the second conductive trace 312B when the first voltage is applied to the second pin diode 314B and has a fourth conductive path 305B through the second pin diode 314B when the second voltage is applied to the second pin diode 314B. The third conductive path has a third electrical path length, the fourth conductive path 305B has a fourth electrical path length, and the fourth electrical path length is shorter than the third electrical path length.

In one embodiment, a first difference between the first electrical path length and the second electrical path length is different than a second difference between the third electrical path length and the fourth electrical path length. This may occur, for example, if the conductive traces 312A-312B are of different lengths. For example, in one embodiment, the first conductive trace 312A has a first length different from a second length of the second conductive trace 312B. Such an embodiment is shown, for example, in FIG. 1.

As described above, the antenna controller 301 may receive information regarding a frequency and configure the antenna 310 to have a total electrical path length corresponding to the frequency by determining which of the first voltage or the second voltage to the first pin diode 314A, determining which of the first voltage or the second voltage to apply the second pin diode 314B, and applying the determined voltages to the first pin diode 314A and the second pin diode 314B. In one embodiment, the antenna controller 301 configures the antenna 310 to have a total electrical path length corresponding to the frequency by applying the first voltage or the second voltage to at least one of the first pin diode or the second pin diode as specified in a lookup table.

As an example, the antenna controller 301 may, in response to receiving information indicative of a first frequency, apply the first voltage to the first pin diode 314A and to the second pin diode 314B to place the first pin diode 314A and the second pin diode 314B in a non-conductive state. As another example, the antenna controller 301 may, in response to receiving information indicative of a second frequency, apply the second voltage to the first pin diode 314A and second pin diode 314B to place the first pin diode 314A and the second pin diode 314B in a conductive state. As another example, the antenna controller 301 may, in response to receiving information indicative of third frequency between the first frequency and the second frequency, apply the first voltage to one of the first pin diode 314A and the second pin diode 314B and apply the second voltage to the other one of the first pin diode 314A and the second pin diode 314B.

FIG. 3B illustrates an antenna 320 including two MOSFETs 324A-324B according to one embodiment. Each of the MOSFETs 324A-324B acts as a switch that can be placed in an open state in which current does not flow through the MOSFET or a closed state in which current flows through the MOSFET. An antenna controller 301 may apply concurrently a first voltage to place the first MOSFET 324A in an open state and a second voltage to place the second MOSFET 324B in a closed state. In one embodiment, the first voltage is approximately zero volts and the second voltage is approximately one volt. In other embodiments, the antenna 320 may include other types of transistors, such as a bipolar junction transistor (BJT), junction gate field-effect transistor (JFET), or any other type of transistor.

FIG. 3C illustrates an antenna 330 including two piezoelectric elements 334A-334B according to one embodiment. Each of the two piezoelectric elements 334A-334B acts as a switch that can be placed in an open state in which current does not flow through the piezoelectric element or a closed state in which current flows through the piezoelectric element. An antenna controller 301 may apply a first voltage to place the first piezoelectric element 334A in an open state and a second voltage to place the second piezoelectric element 334B in a closed state. When the first voltage is applied to the first piezoelectric element 334A, a first portion of the piezoelectric element 334A contracts such that the first portion of the piezoelectric element 334A does not contact a second portion of the piezoelectric element 334A and current does not flow through the first piezoelectric element 334A. When the second voltage is applied to the second piezoelectric element 334B, a first portion of the piezoelectric element 334B expands such that the first portion of the piezoelectric element 334B contacts a second portion of the piezoelectric element 334B and current flows through the second piezoelectric element 334B. In other embodiments, other types of electromechanical switches including expanding and contracting portions may be used as switches.

FIG. 3D illustrates an antenna 340 including two lever elements 344A-344B according to one embodiment. Each of the two lever elements 344A-344B acts as a switch that can be placed in an open state in which current does not flow through the lever element or a closed state in which current flows through the lever element. An antenna controller 302 may apply a first voltage to place the first lever element 344A in an open state and a second voltage to place the second lever element 344B in a closed state. When the first voltage is applied to the first lever element 334A, a first portion of the lever element 344A is repelled from and does not contact a second portion of the lever element 344A and current does not flow through the first lever element 334A. When the second voltage is applied to the second lever element 344B, a first portion of the lever element 344B is attracted to and contacts a second portion of the lever element 334B and current flows through the second lever element 334B. In other embodiments, other types of electromechanical switches including portions that move from a first position to a second position may be used as switches.

If the lever elements 334A-334B have hysteresis, the antenna controller 302 may apply a pulse of the first voltage or the second voltage to change the state of a switch, if the antenna controller 302 determines that the state is to be changed. In one embodiment, the voltage pulses are applied by more than one switch concurrently or simultaneously. In another embodiment, the voltage pulses are applied to more than one switch sequentially. For example, the antenna controller 302 may include logic 304 coupled to a multiplexer 303. The logic 304 may provide a signal to the multiplexer 303 selecting one of the switches and apply a voltage to the selected switch through the multiplexer 303.

FIG. 3E illustrates an antenna 350 including two variable reactance elements 354A-354B according to one embodiment. Each of the two variable reactance elements 354A-354B may act as a switch that can be placed in an open state in which current does not flow through the variable reactance element or a closed state in which current flows through the variable reactance element. An antenna controller 302 may apply a first voltage to place the first variable reactance element 534A in an open state and a second voltage to place the second variable reactance element 354B in a closed state.

Each of the two variable reactance elements 354A-354B may also act in an analog manner having one or more states between an open and closed state in which a variable current flows through the variable reactance element. The variable reactance elements 354A-354B may be used to fine tune a frequency response of the antenna by providing an additional degree of freedom.

The variable reactance elements 354A-354B may include one or more of a variable resistor, inductor, or capacitor. Each variable reactance element 354A-354B may include a switch (such as those described above or another type of switch) and one or more variable reactance component, such as a variable resistor, inductor, or capacitor. Similarly, each of the switches, such as the pin diodes described above with respect to FIG. 3A, may include one or more variable reactance components.

Figure 4:
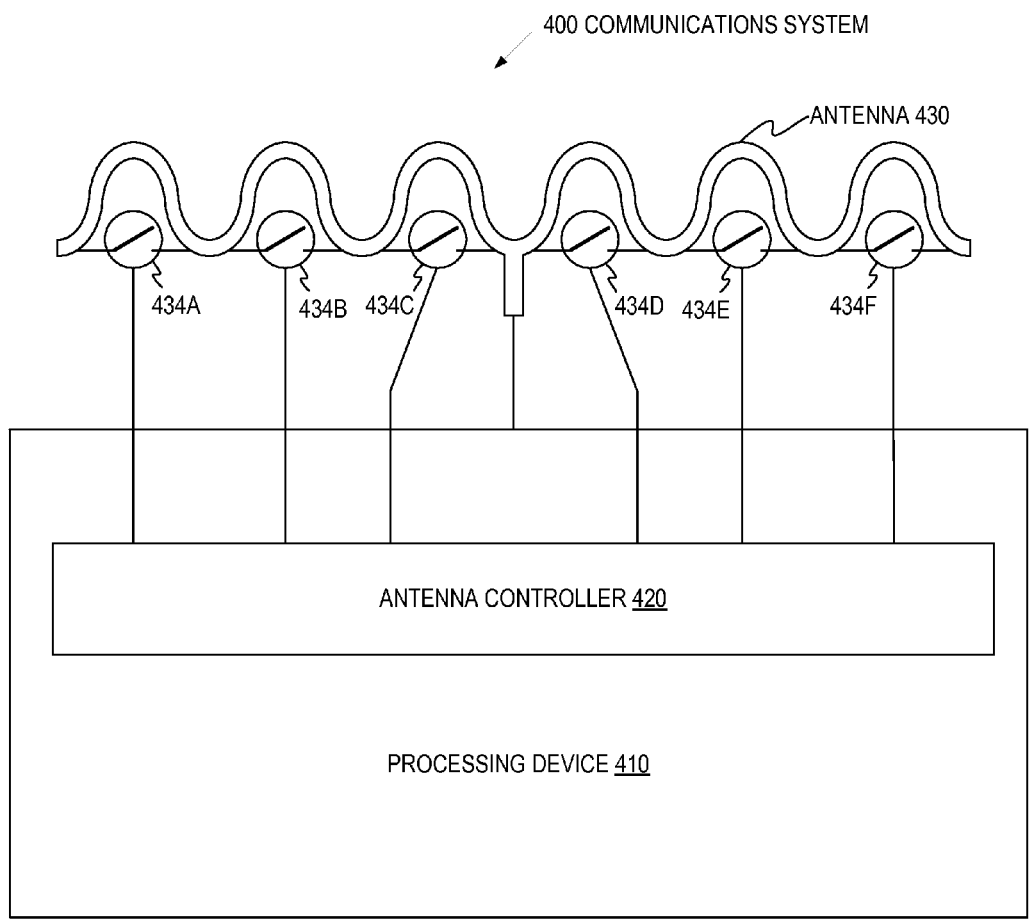
FIG. 4 is a functional block diagram of a communications system including a dipole antenna according to one embodiment.

FIG. 4 is a functional block diagram of a communications system 400 including a dipole antenna 430 according to one embodiment. Like the communication system 100 of FIG. 1, the communications system 400 may be part of an electronic device such as an electronic book reader, a cellular telephone, a tablet computer, a netbook and the like. The communications system 400 includes an antenna 430 with six elements connected in series. Each of the elements includes a conductive trace and a switch 434A-434F connected in parallel.

The antenna 430 is coupled to the processing device 410 which may transmit and receive electromagnetic signals via the antenna 430 at a resonant frequency of the antenna. The resonant frequency of the antenna may be changed by changing the electrical path length of the antenna 430. The electrical path length of the antenna 430 may be changed by an antenna controller 420 coupled to each of the switches 434A-434F of the antenna 430. In one embodiment, the antenna controller 420 is part of the processing device 410. In another embodiment, the antenna controller 420 is a separate element coupled to the processing device 410. Whereas the processing device 110 of FIG. 1 is coupled to the antenna 130 at a first end, the processing device 410 of FIG. 4 is coupled to the antenna 430 in a middle of the antenna 430 between two of the elements.

The antenna 430 may be used to receive two different frequency bands at the same time. In one embodiment, the first three switches 434A-434C are set to receive a signal at a first frequency and the second three switches 434D-434F are set to receive a signal at a second frequency. In one embodiment, the first frequency is a low-band frequency and the second frequency is a high-band frequency. For example, the first frequency may be 700 MHz and the second frequency may be 2.4 GHz.

Figure 5:
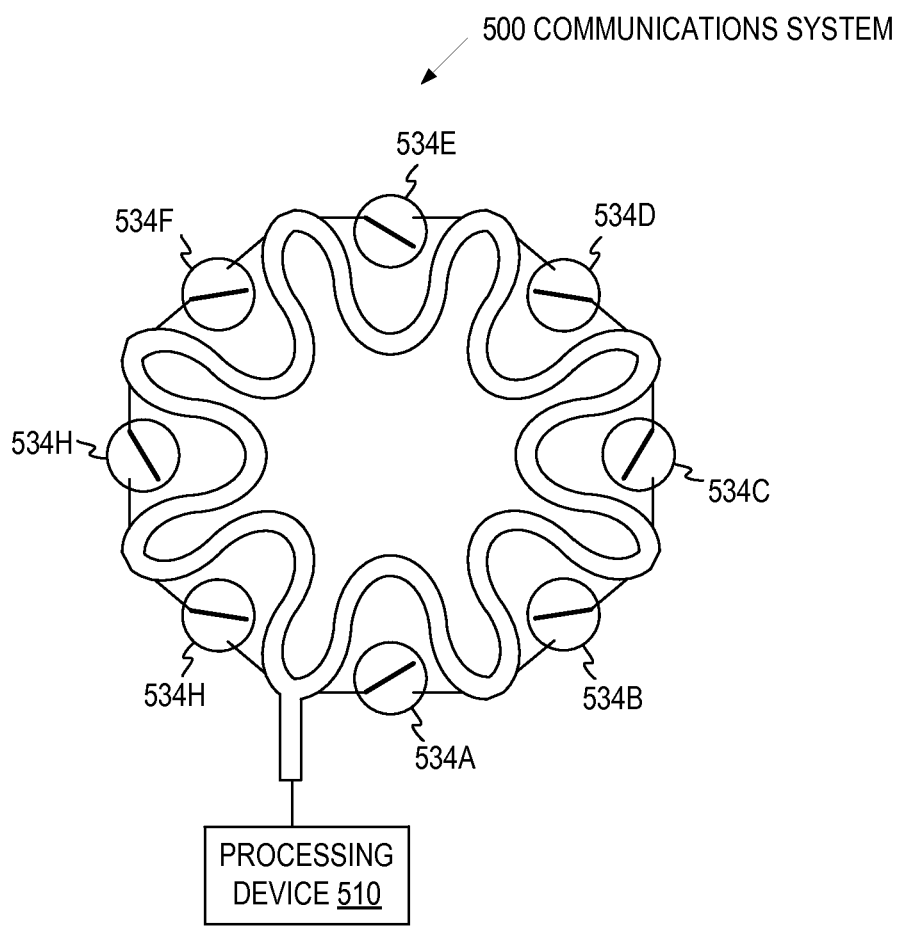
FIG. 5 is a functional block diagram of a communications system including a loop antenna according to one embodiment.

FIG. 5 is a functional block diagram of a communications system 500 including a loop antenna 530 according to one embodiment. Like the communication system 100 of FIG. 1, the communications system 500 may be part of an electronic device such as an electronic book reader, a cellular telephone, a tablet computer, a netbook and the like. The communications system 500 includes an antenna 530 with six elements connected in series to form a loop. Each of the elements includes a conductive trace and a switch 534A-534F connected in parallel.

The antenna 530 is coupled to the processing device 510 which may transmit and receive electromagnetic signals via the antenna 530 at a resonant frequency of the antenna. The resonant frequency of the antenna may be changed by changing the electrical path length of the antenna 530. The electrical path length of the antenna 530 may be changed by an antenna controller coupled to each of the switches 534A-534F of the antenna 530 as either part of the processing device 510 or a separate element. Whereas the processing device 110 of FIG. 1 is coupled to the antenna 130 at a first end, the processing device 510 of FIG. 5 is coupled to the antenna 530 between two elements. The antenna 530 may be of particular use in small electronic devices, such as smart watches.

Figure 6:
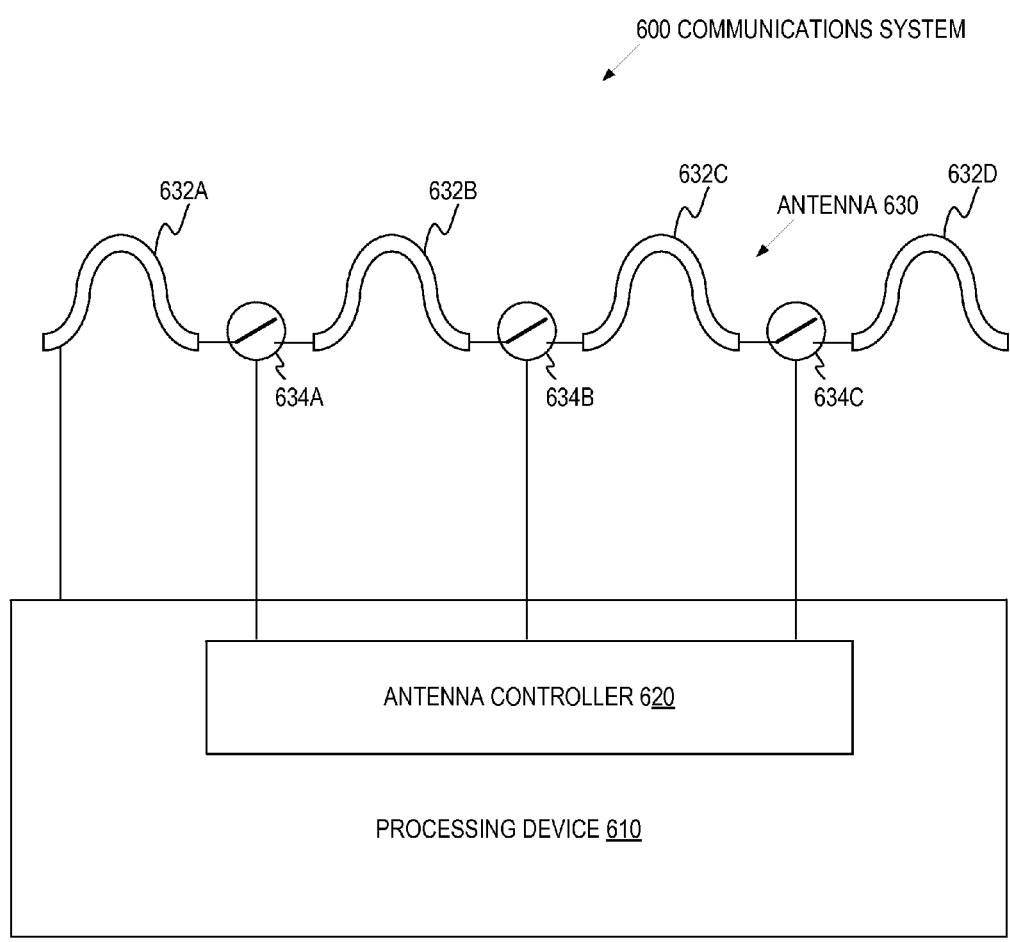
FIG. 6 is a functional block diagram of a communications system including a monopole antenna according to one embodiment.

FIG. 6 is a functional block diagram of a communications system 600 including a monopole antenna 630 according to one embodiment. Like the communication system 100 of FIG. 1, the communications system 600 may be part of an electronic device such as an electronic book reader, a cellular telephone, a tablet computer, a netbook and the like. The communications system 600 includes an antenna 630 with four elements connected in series. Each of the first three elements includes a conductive trace 632A-632C and a switch 634A-634C connected in series. The fourth element includes a final conductive trace 632D, but does not include a switch.

The antenna 630 is coupled to the processing device 610 which may transmit and receive electromagnetic signals via the antenna 630 at a resonant frequency of the antenna. The resonant frequency of the antenna may be changed by changing the electrical path length of the antenna 630. The electrical path length of the antenna 630 may be changed by an antenna controller 620 coupled to each of the switches 634A-634C of the antenna 630. In one embodiment, the antenna controller 420 is part of the processing device 410. In another embodiment, the antenna controller 420 is a separate element coupled to the processing device 410. Whereas the antenna 130 of FIG. 1 includes elements with a conductive trace and a switch connected in parallel, the antenna 630 of FIG. 6 includes elements with a conductive trace and a switch connected in series. Each of the switches 634A-634C couples two of the conductive traces when the switch is in a closed state.

Figure 7:
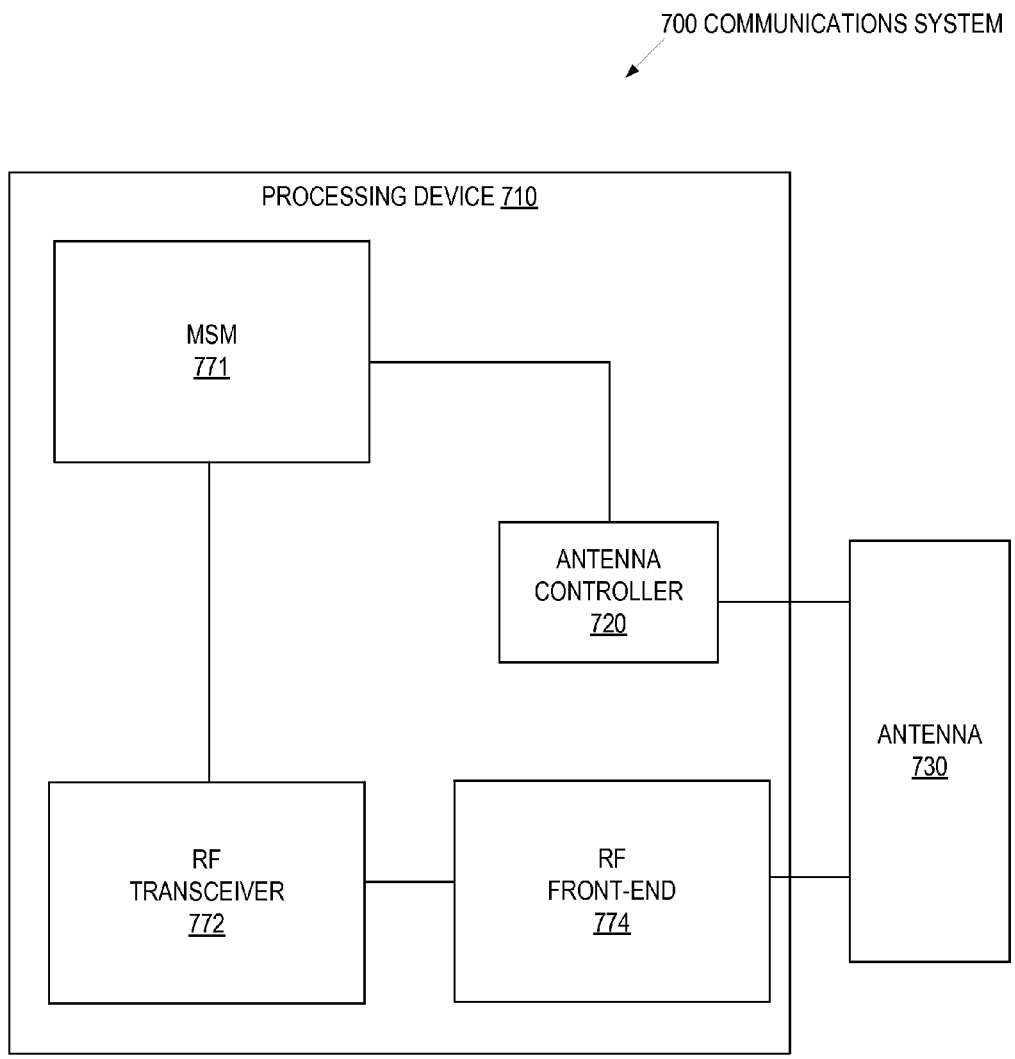
FIG. 7 is a functional block diagram of a communications system including a mobile station modem (MSM) according to one embodiment.

FIG. 7 is a functional block diagram of a communications system 700 including a mobile station modem (MSM) 771 according to one embodiment. The communications system 700 includes a processing device 710 including the MSM 771 coupled to an antenna 730 which may be an antenna with an adjustable electrical path length. The processing device 710 further includes an antenna controller 720 which can adjust the electrical path length of the antenna 730. The antenna controller 720, as described above, may adjust the electrical path length based on received information regarding an intended frequency of operation. Such information may be received from a mobile station modem (MSM) 771.

The processing device 710 may transmit and receive electromagnetic signals via the antenna 730 at a resonant frequency of the antenna through use of a radio frequency (RF) transceiver 772 and an RF front-end 774 included in the processing device 710. When receiving a signal, the RF front-end 774 may demodulate the signal received via the antenna 730, perform analog-to-digital conversion of the signal, or perform other functions. When transmitting a signal, the RF front-end 774 may perform digital-to-analog conversion, modulate a signal for transmission via the antenna 730, or perform other functions. When receiving a signal, the RF transceiver 772 may decode the digital signal or perform other functions. When transmitting a signal, the RF transceiver 772 may encode data to be transmitted or perform other functions.

Figure 8:
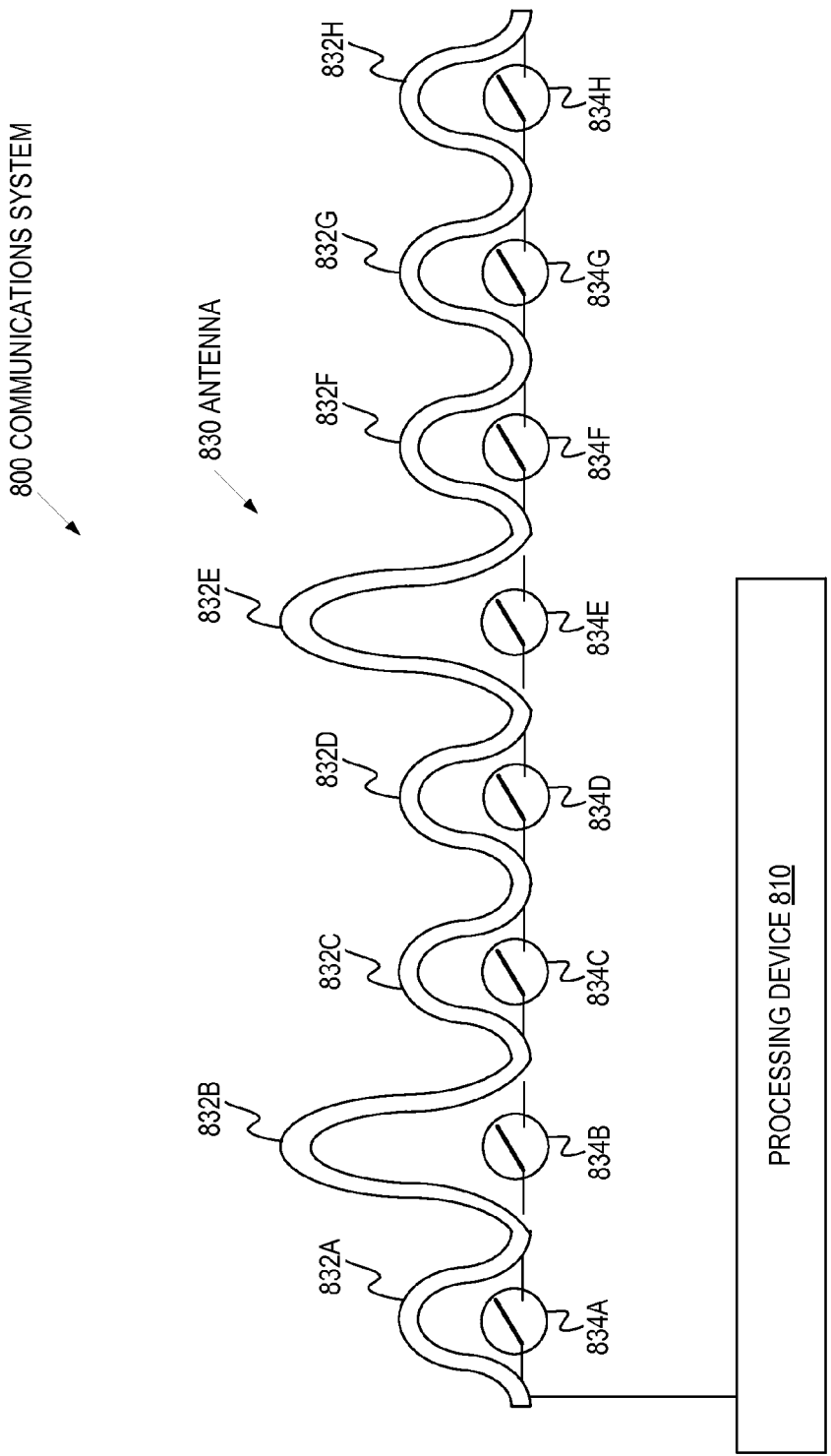
FIG. 8 is functional block diagram of a communications system with an antenna having eight elements according to one embodiment.

FIG. 8 is functional block diagram of a communications system 800 with an antenna 830 having eight elements according to one embodiment. The antenna 830 includes eight elements connected in series, each of the elements including a conductive trace 832A-832H and a switch 834A-834H connected in parallel. The switches 834A-834H may be controlled by an antenna controller (not shown) to be in an open state or a closed state in order to adjust the electrical path length of the antenna 830. The antenna 830 is coupled to a processing device 810 (which may include the antenna controller) at a first end of the antenna. The processing device 810 may transmit and receive electromagnetic signals via the antenna 830 at a resonant frequency of the antenna. The antenna 830 may be enclosed in a housing with a dielectric constant of approximately 3.

In a first configuration, with all of the switches 834A-834H in the open state, the antenna 830 may have an electrical path length of 61.75 millimeters (mm) and a resonant frequency of 700 megahertz (MHz). In a second configuration, with the first six switches 834A-834F in the open state and the last two switches 834G-834H in the closed state, the antenna 830 may have an electrical path length of 48 mm and a resonant frequency of 900 MHz. In a third configuration, with the first four switches 834A-834D in the open state and the last four switches 834E-834H in the closed state, the antenna 830 may have an electrical path length of 22.75 mm and a resonant frequency of 1900 MHz. In a fourth configuration, with the first two switches 834A-834B in the open state and the last six switches 834C-834H in the closed state, the antenna 830 may have an electrical path length of 18.8 mm and a resonant frequency of 2300 MHz. In a fifth configuration, with all of the switches 834A-834H in the closed state, the antenna 830 may have an electrical path length of 16.6 mm and a resonant frequency of 2600 MHz. The antenna 830 may be placed into other configurations.

Thus, in one embodiment, the antenna 830 has a minimum electrical path length of 16.6 mm with all switches in the closed state. By opening the first two switches 834A-834B, the electrical path length of the antenna 830 is increased by 2.2 mm to 18.8 mm. By opening the third and fourth switches 834C-834D, the electrical path length of the antenna 830 is increased by 3.95 mm to 22.75 mm. By opening the fifth and sixth switches 834E-834F, the electrical path length of the antenna 830 is increased by 25.25 mm to 48 mm. By opening the seventh and eighth switches 834G-834H, the electrical path length of the antenna 830 is increased by 13.75 mm to 61.75 mm.

Figure 9:
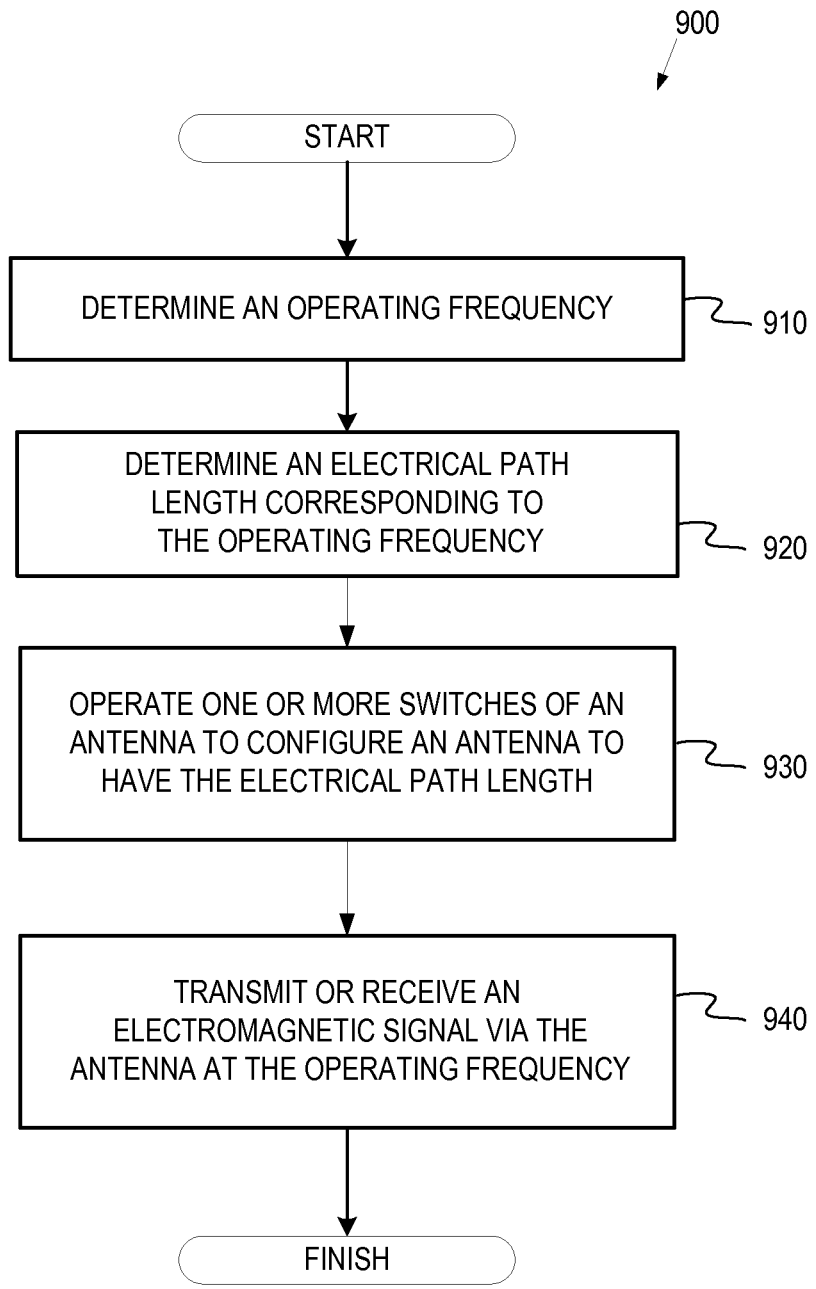
FIG. 9 is a flow diagram of a method of adjusting the electrical path length of an antenna according to one embodiment.

FIG. 9 is a flow diagram of a method 900 of adjusting the electrical path length of an antenna according to one embodiment. The method 900 may be performed by processing logic that may include hardware (e.g., circuitry, dedicated logic, programmable logic, microcode, etc.), software (e.g., instructions executed by a processing device), firmware or a combination thereof. For example, the method 900 may be performed, at least in part, by the processing device 710 of FIG. 7 or by any of the antenna controllers or processing devices described herein.

At block 910, the processing logic determines an operating frequency or intended frequency of operation for the reception and transmission of electromagnetic signals for wireless communication. The processing logic may determine the operating frequency as a particular frequency (e.g., in Hz) or a frequency band (e.g., "frequency band 2"). The processing logic may, for example, determine an operating frequency of 2.4 GHZ to communicate using a WiFi protocol or an operating frequency between 824 MHz and 960 MHz to communicate using a 3G protocol.

At block 920, the processing logic determines an electrical path length for an antenna that corresponds to the operating frequency. Thus, the processing logic may determine the electrical path length based on the operating frequency. The processing logic may determine the electrical path length using a lookup table that stores electrical path length information in association with various operating frequencies. The lookup table may include a plurality of entries, each of the plurality of entries including an operating frequency element that stores data indicative of an operating frequency and an electrical path length element that stores data indicative of an electrical path length corresponding to the operating frequency.

The processing logic may determine the electrical path length using rules or formula without the use of the lookup table. For example, the processing logic may determine the electrical path length by applying a formula to the operating frequency to determine an electrical path length that is approximately equal to a multiple of a half-wavelength of the operating frequency for a dipole antenna or approximately equal to a multiple of a quarter-wavelength of the operating frequency for a monopole antenna.

The processing logic may determine the electrical path length based on a dielectric constant of a material surrounding the antenna. For example, the processing logic may determine a first electrical path length for a particular operating frequency when a user device is being held in a user's hand and may determine a second electrical path length for the particular operating frequency when the mobile device is not being held. In one embodiment, the processing logic consults a first lookup table including state information when a proximity sensor indicates that a user device is being held and consults a second lookup table when the proximity sensor does not indicate that the user device is being held.

The processing logic may determine the electrical path length based on feedback, such as a signal strength of an electromagnetic signal received via the antenna (e.g., in block 940). In one embodiment, the processing logic determines an electrical path length that is incrementally greater or less than a current electrical path length of the antenna. Upon configuring the antenna to have the determined electrical path length (e.g., in block 930) and receiving further signals, the processing logic may determine the electrical path length as the current electrical path length or the previous electrical path length depending on which electrical path length provided better signal strength at the operating frequency.

In one embodiment, the processing logic may determine the electrical path length as a particular length (e.g., in cm) or based on the particular length. The processing logic may determine which ones of the switches to open and which ones of the switches to close based on the particular length. As described in detail above, the total electrical path length of the antenna may be the sum of the electrical path lengths of the elements (in whichever state they are in) plus a fixed electrical path length. The processing logic may use knowledge of the fixed electrical path length and the electrical path lengths of the elements in the non-conductive state and conductive state to determine an electrical path length that is closest to or otherwise matching the particular length and determine which switches to open and close to achieve the electrical path length.

In one embodiment, the processing logic may determine the electrical path length without determining a particular length (e.g., in cm). For example, the processing logic may determine the electrical path length by determining which ones of the switches to open (e.g., by applying the first voltage) and which ones of the switches to close (e.g., by applying the second voltage) directly in view of the operating frequency. For example, as described above, the processing logic may use a lookup table that stores data indicative of a number of different frequencies in respective association with data indicative of which switches are to be opened or closed in order to configure the antenna to have a total electrical path length corresponding to the frequency.

At block 930, the processing logic operates one or more switches of the antenna to configure the antenna to have the determined electrical path length. The processing logic may, in block 920, determine a first set of switches of the antenna to place in the non-conductive state and a second set of switches of the antenna to place in the conductive state and may operate the one or more switches, in block 930, by opening the first set of switches and closing the second set of switches. As noted above with respect to block 920, the processing logic may determine the first set of switches and the second set of switches based on a dielectric constant of a material surrounding the antenna.

By placing one or more switches of antenna elements of the antenna in a non-conductive state, and causing current to flow through a respective conductive trace (having a longer electrical path length) of the antenna element rather than through the switch (having a shorter or negligible electrical path length), the processing logic dynamically creates an antenna of the determined electrical path length by joining together antenna elements (or the conductive traces thereof) to achieve the electrical path length determined in block 920.

In one embodiment, the processing logic sends a voltage signal or otherwise applies a voltage to at least one of the switches to configure the antenna to have the determined electrical path length. The processing logic may apply a voltage to at least one of the switches to change the state from an open state to a closed state or from a closed state to an open state In one embodiment, such as when the switches are solid state switches, the processing logic may continuously and concurrently apply a voltage (which may differ for different switches) to each of the switches to maintain the switches in the open or closed state. For example, the processing logic may apply a voltage of approximately zero volts to open a switch and apply a voltage of approximately one volt to close a switch. In one embodiment, the processing logic sends an optical signal to at least one of the switches to open or close the switch. For example, the switch may be a photodiode that is forward-biased (open) when an optical signal is received and reverse-biased (closed) when no optical signal is received.

In another embodiment, such as when the switches are electromechanical switches with hysteresis, the processing logic may apply a pulse of a voltage to change the state of a switch, if the antenna controller 120 determines that the state is to be changed. If less than all of the switches are to be changed states, the processing logic may apply a pulse of a voltage only to those switches which are to be changed states. A voltage pulse may be applied to more than one switch simultaneously or sequentially, e.g., by using a multiplexer.

As described above with respect to FIG. 4, the processing logic may configure the antenna to receive more than one frequency at the same time. The processing logic may determine the operating frequency (in block 910) and also determine an additional operating frequency. The processing logic may (in block 930) operate a first set of switches of a first portion of the antenna to configure the first portion of the antenna to have a first electrical path length corresponding to the operating frequency and, at the same time, operate a second set of switches of a second portion of the antenna to configure the second portion of the antenna to have a second electrical path length corresponding to the additional operating frequency.

At block 940, the processing logic transmits or receives an electromagnetic signal via an antenna at the operating frequency. The processing logic may, at the same time, also transmit or receive an electrical magnetic signal via the antenna at an additional operating frequency. For example, the processing logic may receive a cellular signal at the operating frequency and a wireless local area network signal at the second operating frequency.

The processing logic may, at a later time, repeat block 910-930 for a second operating frequency and transmit or receive a second electromagnetic signal via the antenna (the same antenna used for the first operating frequency) at the second operating frequency.

In one embodiment, steps of block 910-940 are performed by different components. For example, certain steps may be performed by a MSM (or other processing device) and others by an antenna controller. As illustrated in, e.g., FIG. 7, the MSM and antenna controller may be separate components that are part of the same processing device. In such embodiments, the process may include sending and receiving information indicative of the operating frequency. For example, a processing device (such as an MSM) may determine the operating frequency, send information indicative of the operating frequency to another component, and transmit or receive an electromagnetic signal at the operating frequency. As another example, a processing device (such as an antenna controller) may receive information indicative of the operating frequency from another component, determine an electrical path length corresponding to the operating frequency, and configure the antenna to have the electrical path length.

Figure 10:
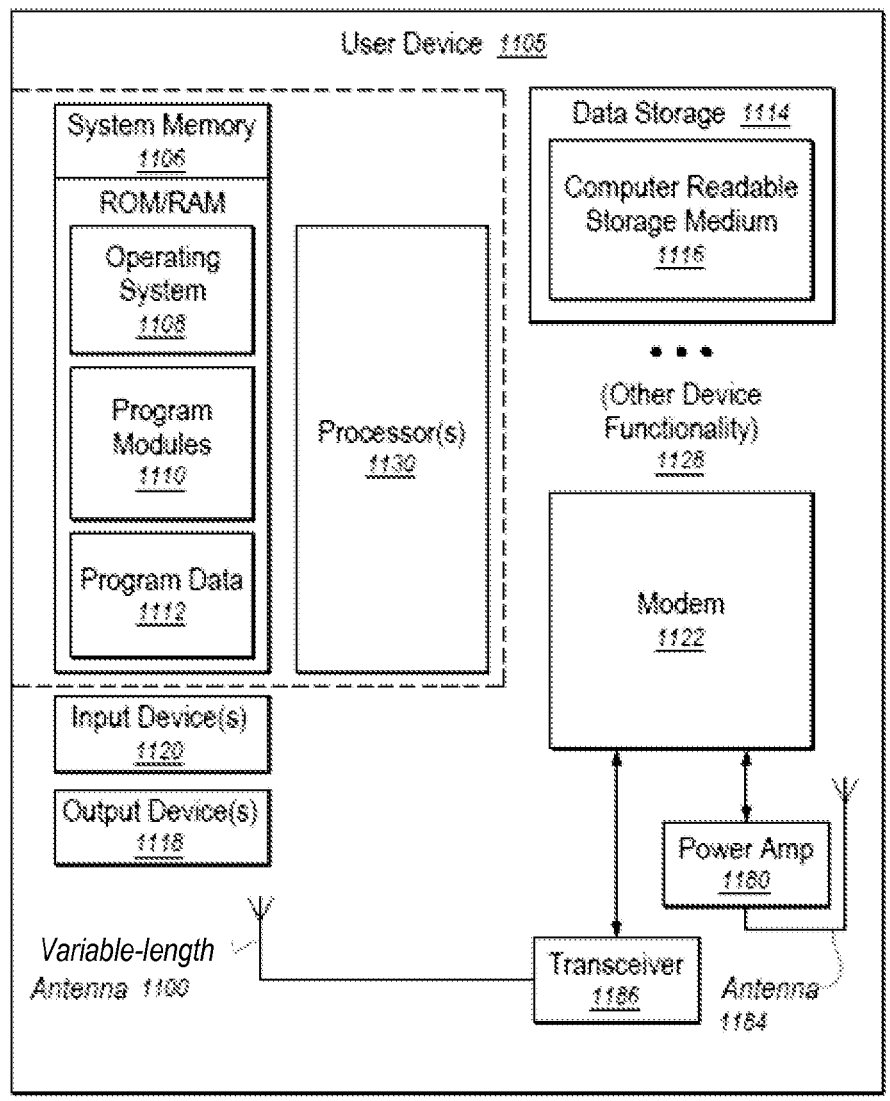
FIG. 10 is a block diagram of a user device having a variable-length antenna according to one embodiment.

FIG. 10 is a block diagram of a user device 1105 having a variable-length antenna 1100 according to one embodiment. The user device 1105 includes one or more processors 1130, such as one or more CPUs, microcontrollers, field programmable gate arrays, or other types of processing devices. The user device 1105 also includes system memory 1106, which may correspond to any combination of volatile and/or non-volatile storage mechanisms. The system memory 1106 stores information, which provides an operating system component 1108, various program modules 1110, program data 1112, and/or other components. The user device 1105 performs functions by using the processor(s) 1130 to execute instructions provided by the system memory 1106.

The user device 1105 also includes a data storage device 1114 that may be composed of one or more types of removable storage and/or one or more types of non-removable storage. The data storage device 1114 includes a computer-readable storage medium 1116 on which is stored one or more sets of instructions embodying any one or more of the functions of the user device 1105, as described herein. As shown, instructions may reside, completely or at least partially, within the computer readable storage medium 1116, system memory 1106 and/or within the processor(s) 1130 during execution thereof by the user device 1105, the system memory 1106 and the processor(s) 1130 also constituting computer-readable media. The user device 1105 may also include one or more input devices 1120 (keyboard, mouse device, specialized selection keys, etc.) and one or more output devices 1118 (displays, printers, audio output mechanisms, etc.).

The user device 1105 further includes a wireless modem 1122 to allow the user device 1105 to communicate via a wireless network (e.g., such as provided by a wireless communication system) with other computing devices, such as remote computers, an item providing system, and so forth. The wireless modem 1122 allows the user device 1105 to handle both voice and non-voice communications (such as communications for text messages, multimedia messages, media downloads, web browsing, etc.) with a wireless communication system. The wireless modem 1122 may provide network connectivity using any type of digital mobile network technology including, for example, cellular digital packet data (CDPD), general packet radio service (GPRS), enhanced data rates for GSM evolution (EDGE), UMTS, 1 times radio transmission technology (1×RTT), evaluation data optimized (EVDO), high-speed downlink packet access (HSDPA), WLAN (e.g., Wi-Fi® network), etc. In other embodiments, the wireless modem 1122 may communicate according to different communication types (e.g., WCDMA, GSM, LTE, CDMA, WiMax, etc) in different cellular networks. The cellular network architecture may include multiple cells, where each cell includes a base station configured to communicate with user devices within the cell. These cells may communicate with the user devices 1105 using the same frequency, different frequencies, same communication type (e.g., WCDMA, GSM, LTE, CDMA, WiMax, etc), or different communication types. Each of the base stations may be connected to a private, a public network, or both, such as the Internet, a local area network (LAN), a public switched telephone network (PSTN), or the like, to allow the user devices 1105 to communicate with other devices, such as other user devices, server computing systems, telephone devices, or the like. In addition to wirelessly connecting to a wireless communication system, the user device 1105 may also wirelessly connect with other user devices. For example, user device 1105 may form a wireless ad hoc (peer-to-peer) network with another user device.

The wireless modem 1122 may generate signals and send these signals to power amplifier (amp) 1180 or transceiver 1186 for amplification, after which they are wirelessly transmitted via the variable-length antenna 1100 or antenna 1184, respectively. Although FIG. 10 illustrates power amp 1180 and transceiver 1186, in other embodiments, a transceiver may be used for all the antennas 1100 and 1184 to transmit and receive. Or, power amps can be used for both antennas 1100 and 1184. The antenna 1184, which is an optional antenna that is separate from the variable-length antenna 1100, may be any directional, omnidirectional or non-directional antenna. The antenna 1184 may also transmit information using different wireless communication protocols than the variable-length antenna 1100. In addition to sending data, the variable-length antenna 1100 and the antenna 1184 also receive data, which is sent to wireless modem 1122 and transferred to processor(s) 1130. It should be noted that, in other embodiments, the user device 1105 may include more or less components as illustrated in the block diagram of FIG. 10. In one embodiment, the variable-length antenna 1100 is the antenna 130 of FIG. 1. In another embodiment, the variable-length antenna 1100 is the antenna 830 of FIG. 8. Alternatively, the phase-controlled antenna 1100 may be other antennas as described herein.

In one embodiment, the user device 1105 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of the variable-length antenna 1100 that operates at a first frequency band and the second wireless connection is associated with a second resonant mode of the variable-length antenna 1100 that operates at a second frequency band. In another embodiment, the first wireless connection is associated with the variable-length antenna 1100 and the second wireless connection is associated with the antenna 1184. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a single modem 1122 is shown to control transmission to both antennas 1100 and 1184, the user device 1105 may alternatively include multiple wireless modems, each of which is configured to transmit/receive data via a different antenna and/or wireless transmission protocol. In addition, the user device 1105, while illustrated with two antennas 1100 and 1184, may include more or fewer antennas in various embodiments.

The user device 1105 delivers and/or receives items, upgrades, and/or other information via the network. For example, the user device 1105 may download or receive items from an item providing system. The item providing system receives various requests, instructions and other data from the user device 1105 via the network. The item providing system may include one or more machines (e.g., one or more server computer systems, routers, gateways, etc.) that have processing and storage capabilities to provide the above functionality. Communication between the item providing system and the user device 1105 may be enabled via any communication infrastructure. One example of such an infrastructure includes a combination of a wide area network (WAN) and wireless infrastructure, which allows a user to use the user device 1105 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 1105.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1105 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1105 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An electronic device comprising:
an antenna comprising a first element physically connected in series to a second element,
wherein the first element comprises a first conductive trace with a first end and a second end and a first diode coupled between the first end and the second end of the first conductive trace,
wherein the first element has a first conductive path through the first conductive trace when a first voltage is applied to the first diode and has a second conductive path through the first diode when a second voltage is applied to the first diode, wherein the first conductive path has a first electrical path length, the second conductive path has a second electrical path length, and the second electrical path length is shorter than the first electrical path length,
wherein the second element comprises a second conductive trace with a first end and a second end and a second diode coupled between the first end and the second end of the second conductive trace,
wherein the second element has a third conductive path through the second conductive trace when the first voltage is applied to the second diode and has a fourth conductive path through the second diode when the second voltage is applied to the second diode, wherein the third conductive path has a third electrical path length, the fourth conductive path has a fourth electrical path length, and the fourth electrical path length is shorter than the third electrical path length; and
an antenna controller coupled to the first diode and the second diode, wherein the antenna controller is to configure the antenna to have a total electrical path length corresponding to an operating frequency by applying the first voltage or the second voltage to the first diode and applying the first voltage or the second voltage to the second diode.

2. The electronic device of claim 1, wherein the antenna controller is to configure the antenna to have a first total electrical path length corresponding to a first operating frequency by applying the first voltage to the first diode and configure the antenna to have a second total electrical path length corresponding to a second operating frequency by applying the second voltage to the first diode.

3. The electronic device of claim 1, further comprising a processing device to:
determine the operating frequency;
determine the total electrical path length corresponding to the operating frequency;
determine which of the first voltage or the second voltage is to be applied to the first diode; and
cause the antenna controller to apply the first voltage or the second voltage to the first diode.

4. A system comprising:
an antenna comprising a first element physically connected to a second element, wherein:
the first element comprises:
a first conductive trace with a first end and a second end; and
a first electrical switch coupled between the first end and the second end of the first conductive trace, wherein the first element has a first electrical path length when the first electrical switch is in a non-conductive state and a second electrical path length when the electrical switch is in a conductive state; and
the second element comprises:
a second conductive trace with a first end and a second end; and
a second electrical switch coupled between the first end and the second end of the second conductive trace, wherein the second element has a first electrical path length when the second electrical switch is in a non-conductive state and a second electrical path length when the electrical switch is in a conductive state; and
an antenna controller to:
receive information indicative of an operating frequency; and
configure the antenna to have a total electrical path length corresponding to the operating frequency by placing the first electrical switch in the non-conductive state or the conductive state and placing the second electrical switch in the conductive or the non-conductive state.

5. The system of claim 4, wherein the first electrical switch or the second electrical switch comprises at least one of a pin diode, a metal-oxide-semiconductor field-effect transistor (MOSFET), or an electromechanical switch.

6. The system of claim 4, wherein the first conductive trace is connected in parallel with the first electrical switch.

7. The system of claim 6, wherein the first conductive trace has a first length different from a second length of the second conductive trace.

8. The system of claim 4, wherein the first conductive trace is connected in series with the first electrical switch.

9. The system of claim 4, wherein the first element comprises a variable reactance element.

10. The system of claim 4, wherein the first element and the second element are electrically coupled in series.

11. The system of claim 4, wherein the antenna is at least one of a monopole antenna, a dipole antenna, or a loop antenna.

12. The system of claim 4, further comprising:
a modem to send the information indicative of the operating frequency to the antenna controller; and
a radio frequency front-end to transmit or receive an electromagnetic signal via the antenna at the operating frequency.

13. A method comprising:
determining, by a processing device, an operating frequency of an antenna with a first antenna element and a second antenna element; and
determining an electrical path length for the operating frequency;
operating, by the processing device, a first electrical switch that is located between a first end and a second end of the first antenna element to configure the antenna to have an electrical path length corresponding to the operating frequency; and
operating, by the processing device, a second electrical switch that is located between a first end and a second end of the second antenna element in a conductive state or a non-conductive state to configure the antenna to have an electrical path length corresponding to the operating frequency.

14. The method of claim 13, wherein the first electrical switch and the second electrical switch are operated based on a dielectric constant of a material surrounding the antenna.

15. The method of claim 13, wherein determining the electrical path length comprises determining the electrical path length using a lookup table comprising a plurality of entries, each of the plurality of entries including an operating frequency element that stores data indicative of an operating frequency and an electrical path length element that stores data indicative of an electrical path length corresponding to the operating frequency.

16. The method of claim 13, wherein determining the electrical path length comprises applying a formula to the operating frequency to determine an electrical path length that is approximately equal to a multiple of a quarter-wavelength of the operating frequency.

17. The method of claim 13, wherein operating the first electrical switch and the second electrical switch comprises concurrently sending a signal to first electrical switch and the second electrical switch, wherein the signal comprises at least one of an optical signal or a voltage signal.

18. The method of claim 13, further comprising determining an additional operating frequency, wherein operating the first electrical switch and the second electrical switch comprises:

operating the first electrical switch to configure a first portion of the antenna to have a first electrical path length corresponding to the operating frequency; and operating the second electrical switch to configure a second portion of the antenna to have a second electrical path length corresponding to the additional operating frequency.

19. The method of claim 18, further comprising transmitting or receiving a cellular signal at the operating frequency and transmitting or receiving a wireless local area network signal at the additional operating frequency.

* * * * *